(12) United States Patent
Saam

(10) Patent No.: US 8,690,134 B1
(45) Date of Patent: Apr. 8, 2014

(54) EQUIPMENT SUPPORT RACK ASSEMBLY

(76) Inventor: Ben J. Saam, Twin Lakes, WI (US)

(*) Notice: Subject to any disclaimer, the term of this patent is extended or adjusted under 35 U.S.C. 154(b) by 140 days.

(21) Appl. No.: 13/490,173

(22) Filed: Jun. 6, 2012

(51) Int. Cl.
*B23Q 3/00* (2006.01)

(52) U.S. Cl.
USPC ............. 269/17; 269/16; 254/120; 254/124; 254/131

(58) Field of Classification Search
USPC .................. 269/16, 17; 254/120, 124, 131
See application file for complete search history.

(56) References Cited

U.S. PATENT DOCUMENTS

| | | | |
|---|---|---|---|
| 3,087,585 A | 4/1963 | Knuth et al. | |
| 4,894,691 A | 1/1990 | Matsui | |
| 4,958,804 A | 9/1990 | Lenius et al. | |
| 5,324,005 A | 6/1994 | Beattie et al. | |
| 5,551,773 A * | 9/1996 | Cottrell | 312/249.8 |
| 5,632,475 A | 5/1997 | McCanse | |
| 5,678,804 A | 10/1997 | Lintelman et al. | |
| D395,659 S | 6/1998 | Moiseve | |
| 6,474,626 B1 * | 11/2002 | Box | 254/131 |

* cited by examiner

*Primary Examiner* — Lee D Wilson
*Assistant Examiner* — Shantese McDonald

(57) ABSTRACT

An equipment support rack assembly for holding equipment during the maintenance thereof includes a base with a top wall, a bottom wall and a perimeter wall. The perimeter has an aperture to access an interior of the base. A rod is attached to the base and receives a spool of cutting line. A plurality of legs each has a top end and a bottom end. Each of the legs extends upwardly from the upper surface. A platform has a top side and a bottom side. The bottom side is attached to the top ends of each of the legs. The top side has an opening extending through the top and bottom sides. The opening is configured to receive a weed trimmer or to allow access to a bottom side of a lawn mower positioned on the top side.

9 Claims, 7 Drawing Sheets

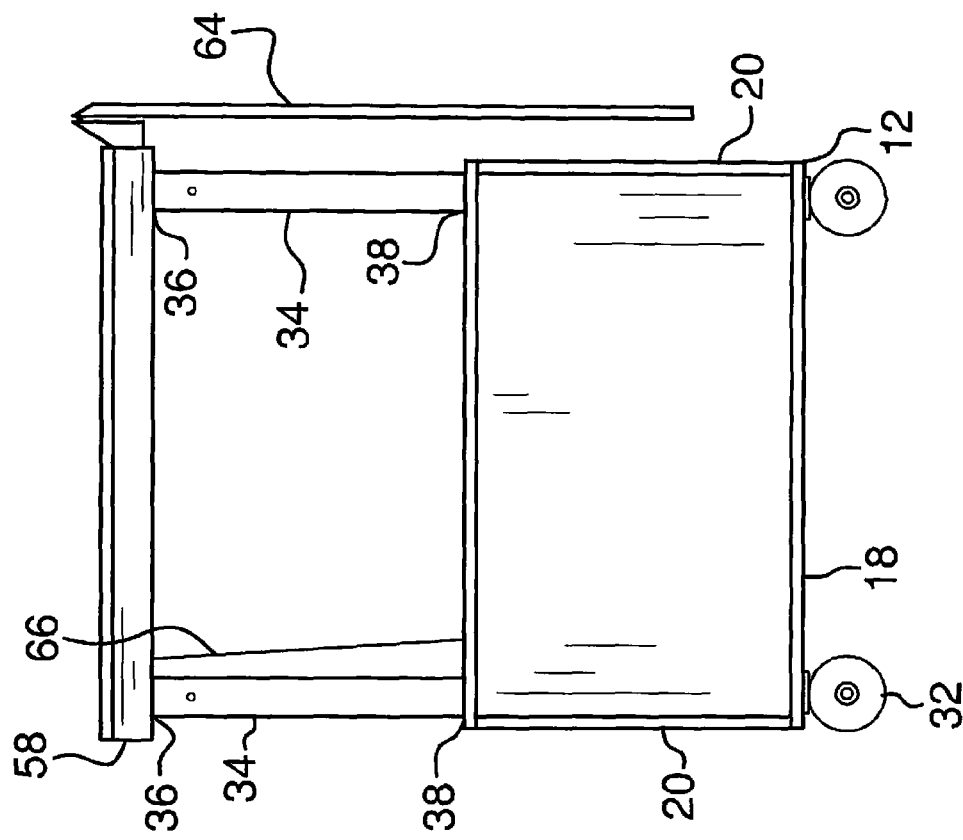
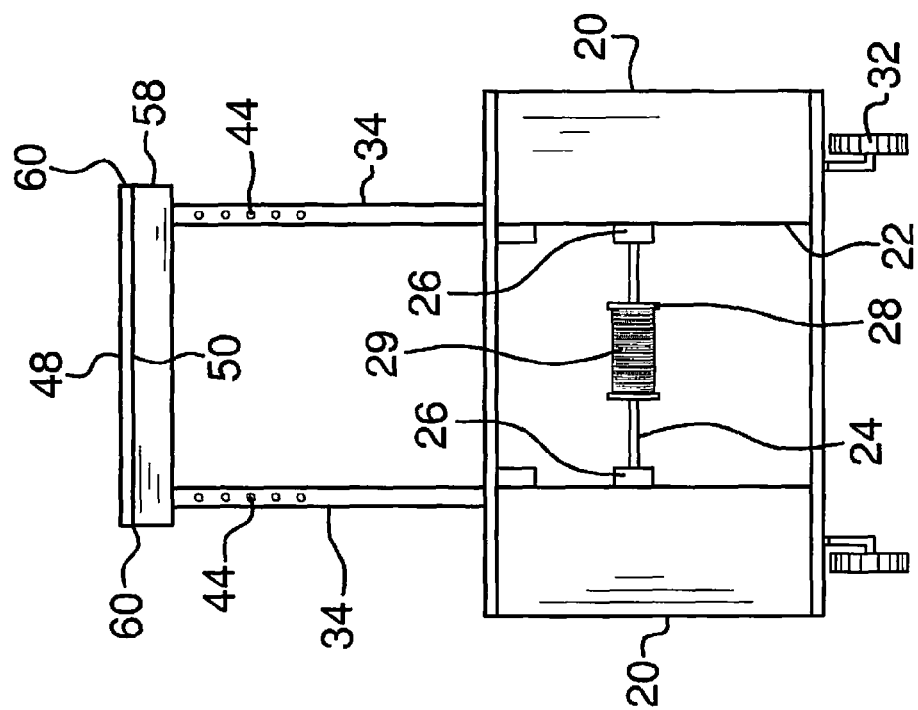
FIG. 2
FIG. 1

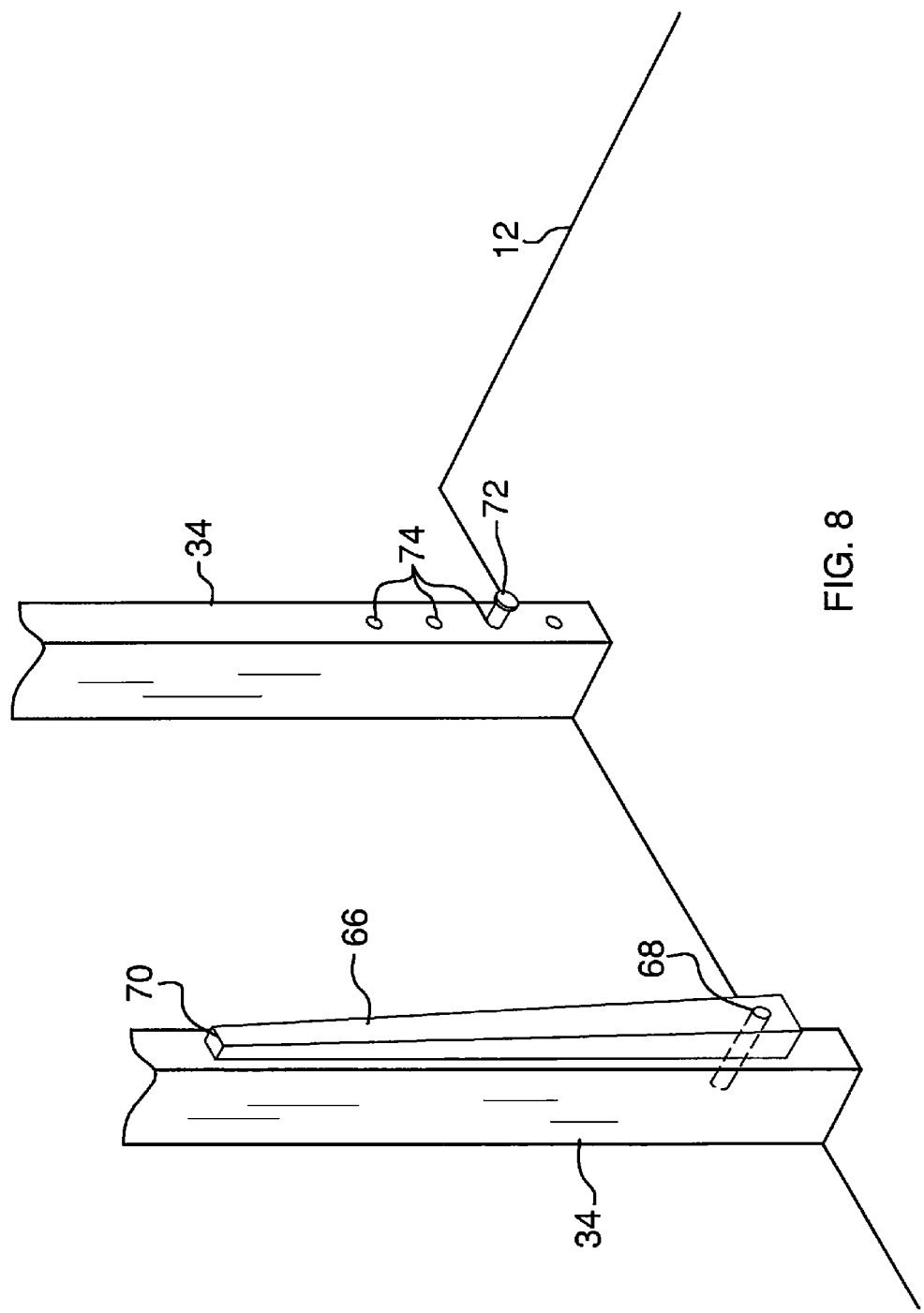

EQUIPMENT SUPPORT RACK ASSEMBLY

BACKGROUND OF THE DISCLOSURE

1. Field of the Disclosure

The disclosure relates to equipment support devices and more particularly pertains to a new equipment support device for holding equipment during the maintenance thereof.

2. Summary of the Disclosure

An embodiment of the disclosure meets the needs presented above by generally comprising an equipment support rack assembly configured for holding equipment during the maintenance thereof that includes a base with a top wall, a bottom wall and a perimeter wall. The perimeter wall is attached to and extends between the top and bottom walls. The perimeter has an aperture extending therethrough to access an interior of the base. A rod is attached to the base and is configured to receive a spool of cutting line so that the cutting line can be easily removed from the spool. The top wall has a guide hole extending therethrough. The guide hole is configured to receive the cutting line. A plurality of legs each has a top end and a bottom end. The bottom end of each of the legs is attached to an upper surface of the top wall. Each of the legs extends upwardly from the upper surface. A platform has a top side and a bottom side. The bottom side is attached to the top ends of each of the legs. The top side has an opening therein extending through the top and bottom sides. The opening is configured to receive a weed trimmer or to allow access to a bottom side of a lawn mower positioned on the top side.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein:

FIG. 1 is a front view of a equipment support rack assembly according to an embodiment of the disclosure.

FIG. 2 is a side view of an embodiment of the disclosure.

FIG. 8 is a side perspective view of an embodiment of the disclosure.

DESCRIPTION OF THE PREFERRED EMBODIMENT

Figure 3:
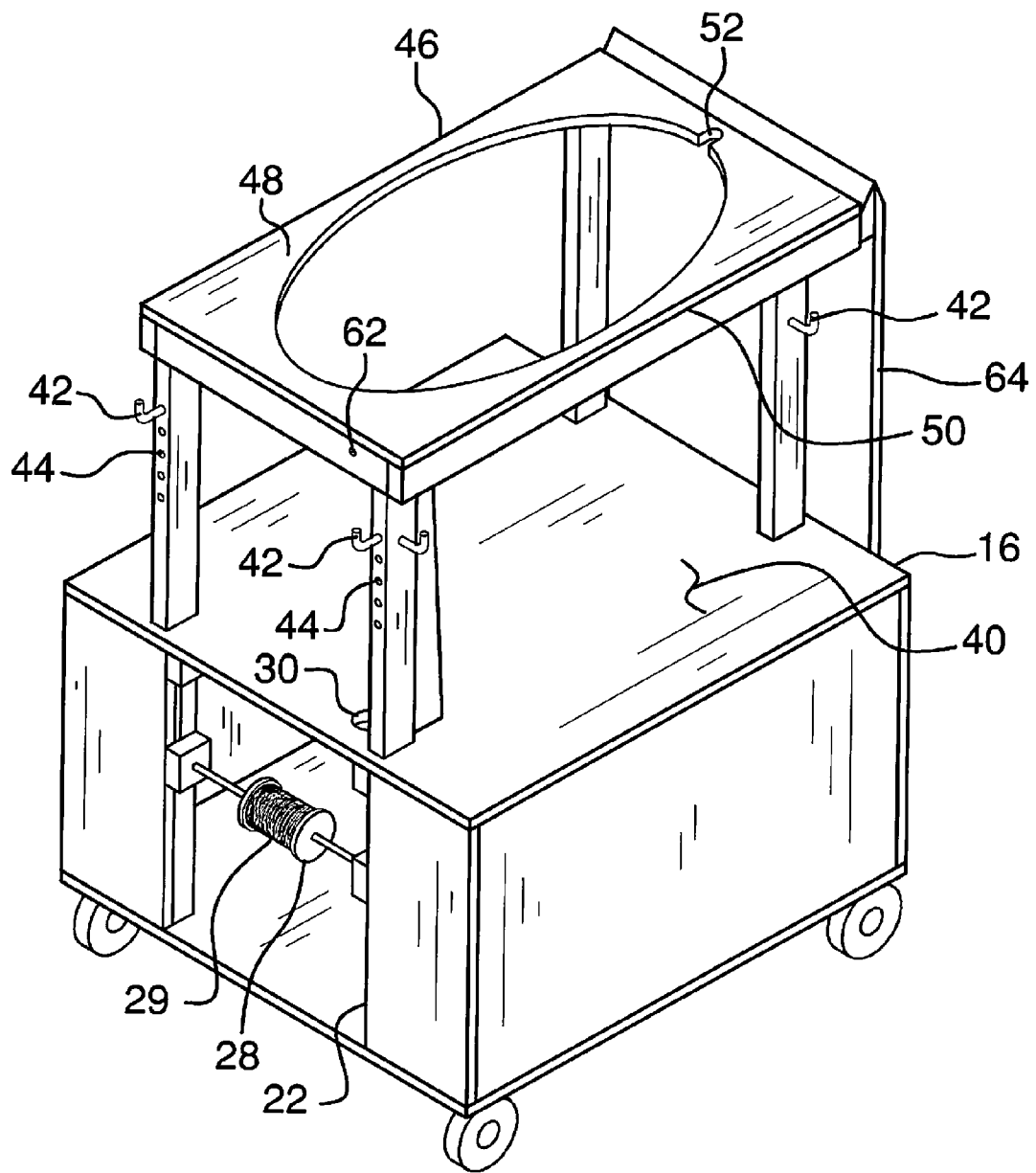
FIG. 3 is a top perspective view of an embodiment of the disclosure.
Figure 4:
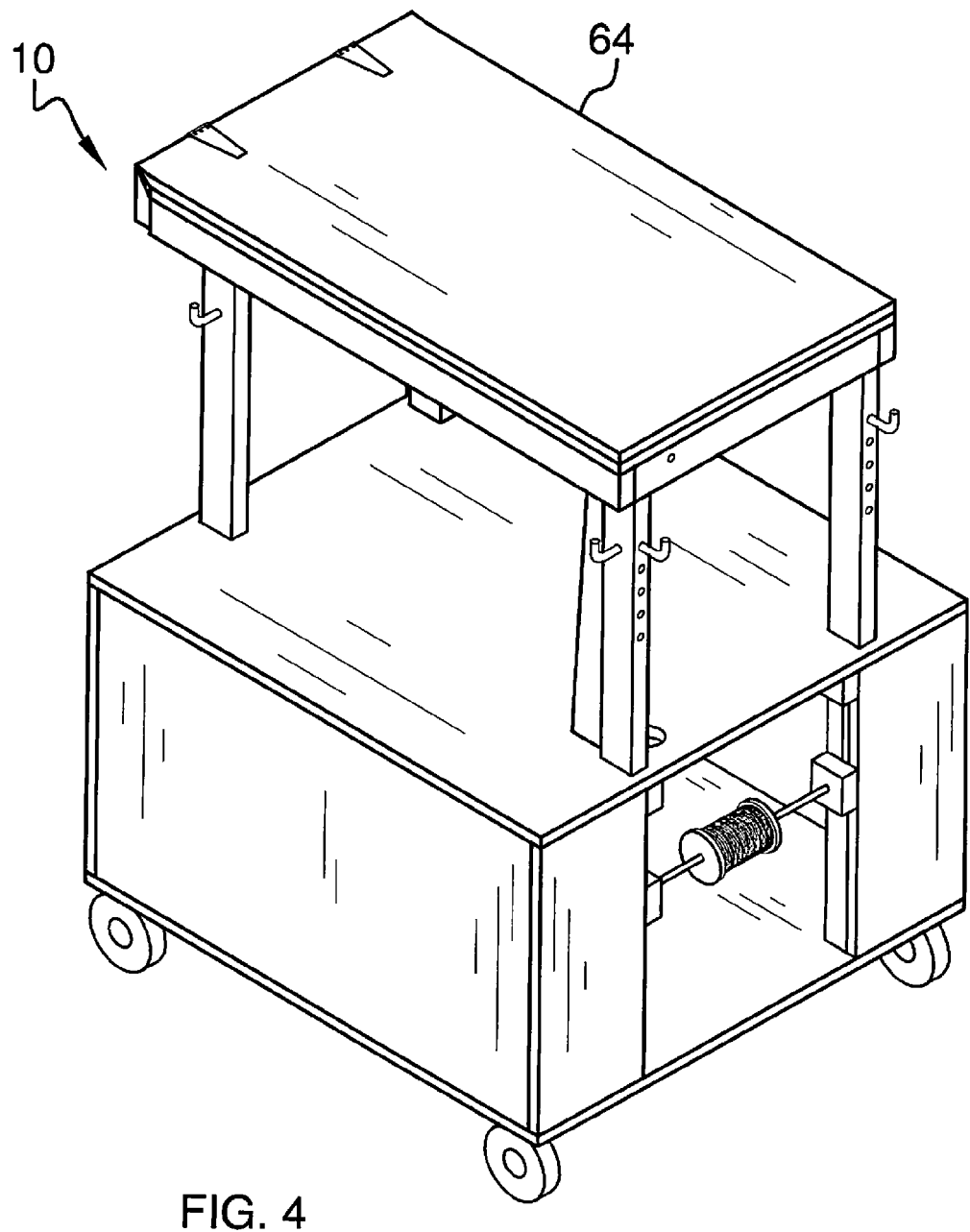
FIG. 4 is a top perspective view of an embodiment of the disclosure.
Figure 5:
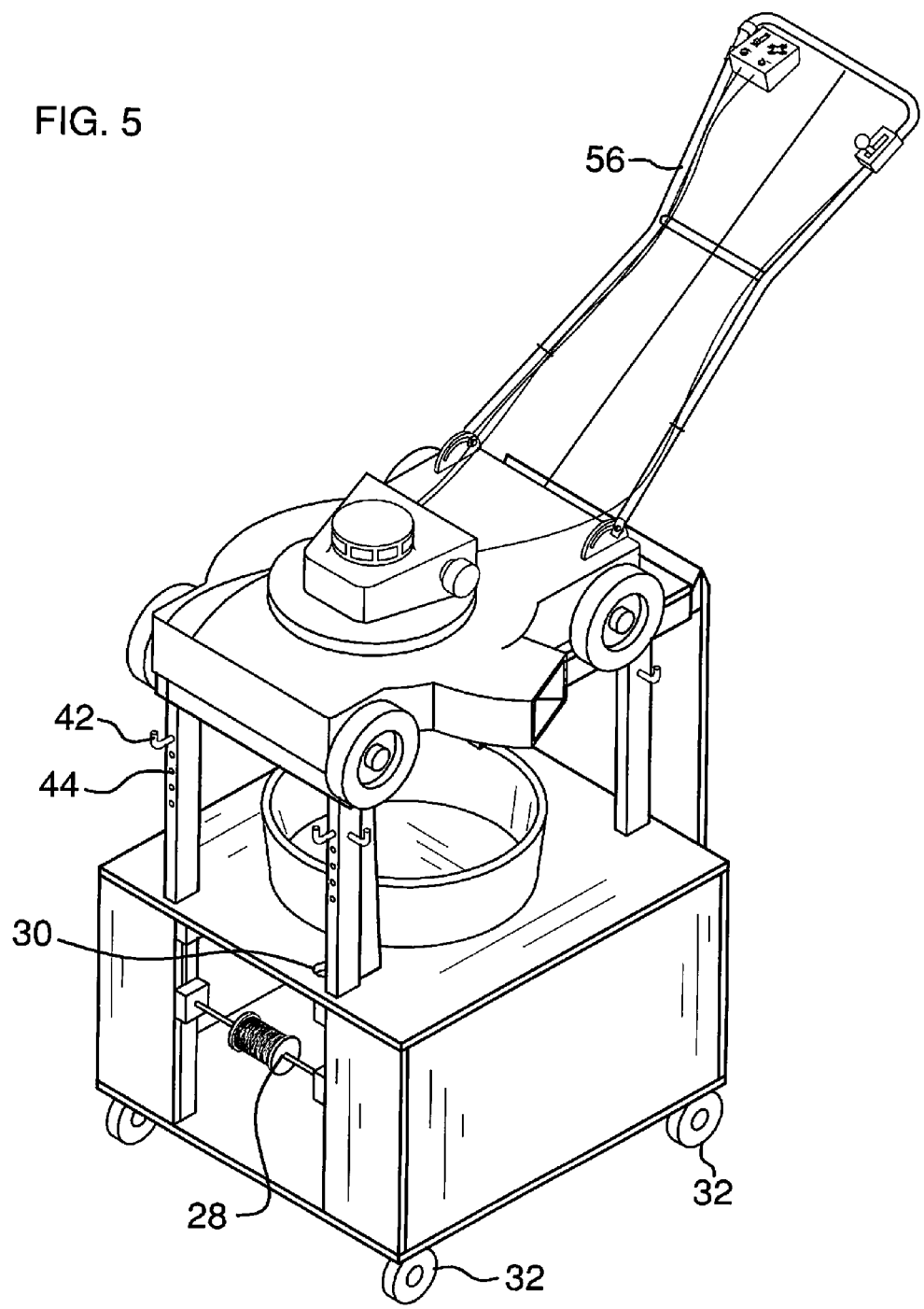
FIG. 5 is a top perspective view of an embodiment of the disclosure.
Figure 6:
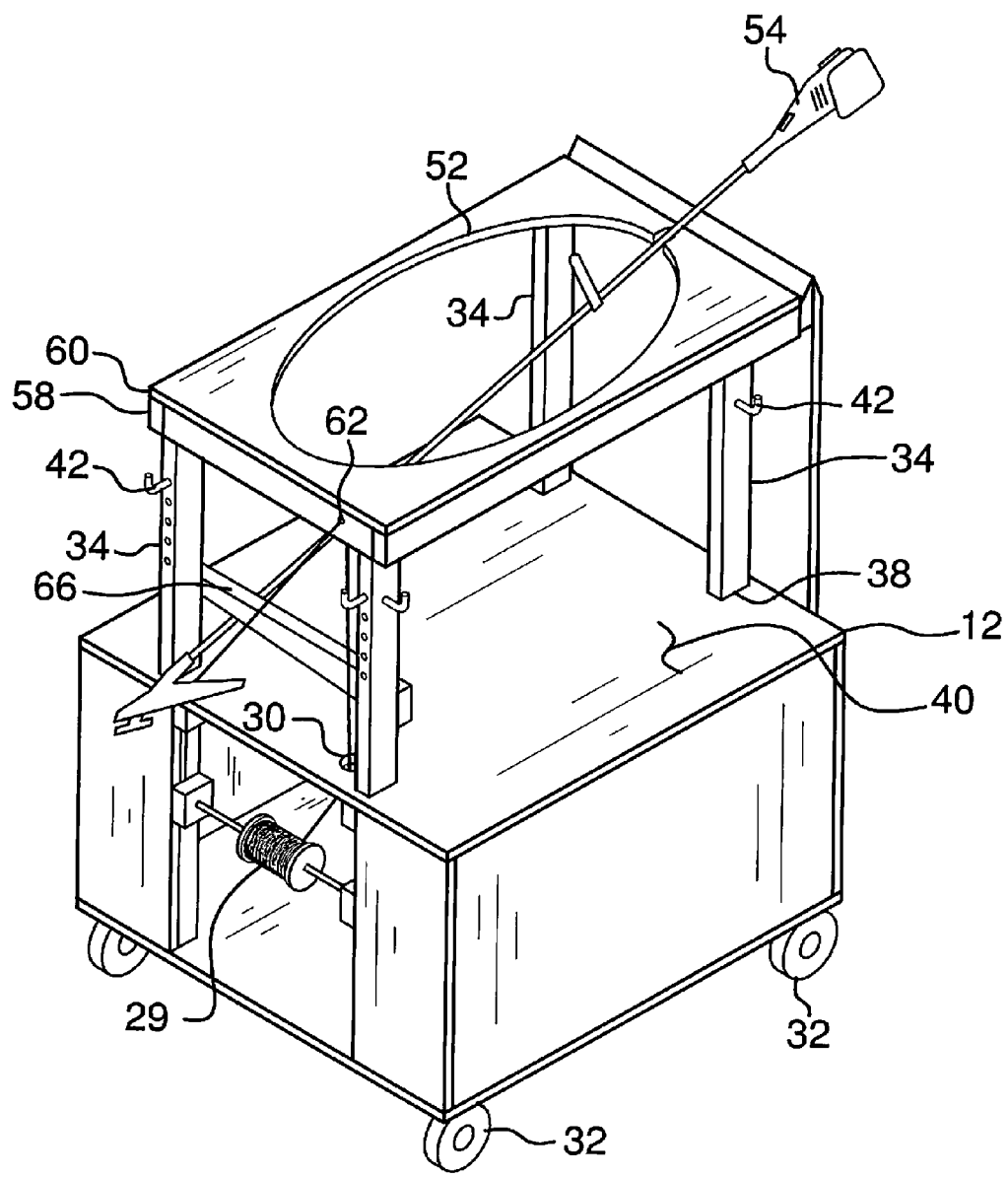
FIG. 6 is a top perspective view of an embodiment of the disclosure.
Figure 7:
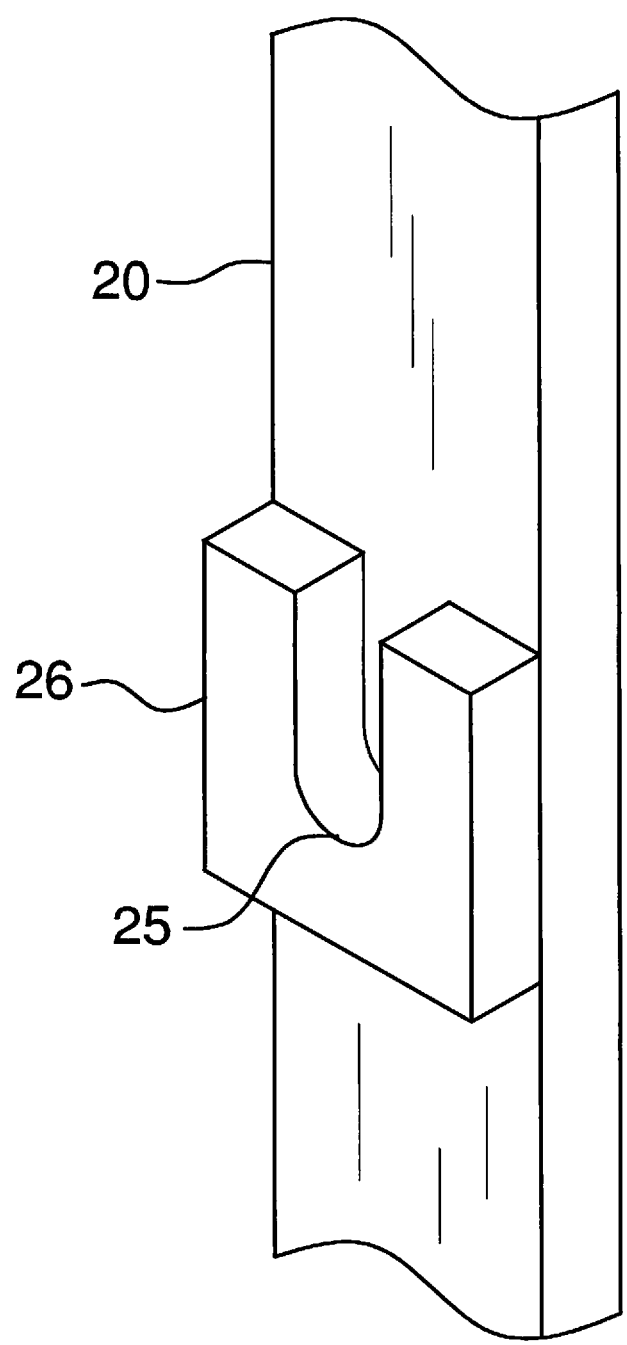
FIG. 7 is a front perspective view of an embodiment of the disclosure.

With reference now to the drawings, and in particular to FIGS. 1 through 8 thereof, a new equipment support device embodying the principles and concepts of an embodiment of the disclosure and generally designated by the reference numeral 10 will be described.

As best illustrated in FIGS. 1 through 8, the equipment support rack assembly 10 generally comprises a base 12 with a top wall 16, a bottom wall 18 and a perimeter wall 20. The perimeter wall 20 is attached to and extends between the top 16 and bottom walls 18. The perimeter 20 has an aperture 22 extending through it to access an interior of the base 12. The base may have a length and width each between 20 inches and 30 inches and the perimeter wall may have a height greater than 15 inches. A plurality of wheels 32 is attached to the bottom wall 18.

A rod 24 is attached to the base 12 and is attached to blocks 26 which are mounted to the perimeter wall 20 so that the rod 24 traverses the aperture 22. The rod 24 has a horizontal axis and each end of the rod 24 sits in a channel 25 on the top of each block 26. The rod 24 is configured to receive a spool 28 of cutting line 29 so that the cutting line 29 can be easily removed from the spool 28. The cutting line 29 is conventional to weed trimmers. The top wall 16 has a guide hole 30 extending through it. The guide hole 30 is configured to receive the cutting line 29 from the spool 28.

A plurality of legs 34 each has a top end 36 and a bottom end 38. The bottom end 38 of each of the legs 34 is attached to an upper surface 40 of the top wall 16. Each of the legs 34 extends upwardly from the upper surface 40. The legs may each have a height between 14 inches and 20 inches. A plurality of hooks 42 are each extendable into one of the legs 34. Each of the legs 34 has a plurality of wells 44 in it for receiving one of the hooks 42. The wells 44 in associated ones of the legs 34 are vertically aligned with each other to allow selective positioning of the hooks 42 in the legs.

A platform 46 has a top side 48 and a bottom side 50. The bottom side 50 is attached to the top ends 36 of each of the legs 34. The top side 48 has an opening 52 which extends through the top 48 and bottom sides 50. The opening 52 is configured to receive a weed trimmer 54 or to allow access to a bottom side of a lawn mower 56 positioned on the top side 48. A lid 64 may be hingedly coupled to the platform 46 and is positionable in a closed position which covers the opening 52 or in a open position which exposes the opening 52. A flange 58 is attached to and extends downwardly from a perimeter edge 60 of the platform 46. The flange 58 is coextensive with the perimeter edge 60. The flange 58 has a conduit 62 extending through it. The conduit 62 is configured to receive the cutting line 29 from the guide hole 30.

A support bar 66 is pivotally coupled to one of the legs 34. The center of a pivot point 68 is positioned above the upper surface 40. A movable end 70 of the support bar 66 is secured with an adjustable locking pin 72 which sits in one of a plurality of depressions 74 on an oppositely positioned leg 34. The support bar 66 is configured to extend between two of the legs 66 to engage an article positioned between the platform 46 and the base 12.

In use, a piece of equipment needing maintenance is positioned on the assembly 10 for ease of access. The piece of equipment may be placed on the platform 46 or may be extended through the opening 52 and secured with the support bar 66. The spool 28 of cutting line 29 may be used either by routing through the guide hole 30 and conduit 62 or as otherwise needed. If the equipment is placed on the platform 46, the lid 64 may be placed in either the open or closed position. The equipment may generally contain any type of gardening or landscaping power tool and in particular lawn mowers and weed trimmers.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

I claim:

1. An equipment support rack assembly configured for holding equipment during the maintenance thereof, said assembly comprising:
   a base having a top wall, a bottom wall and a perimeter wall being attached to and extending between said top and bottom walls, said perimeter having an aperture extending therethrough to access an interior of said base;
   a rod being attached to said base, said rod being configured to receive a spool of cutting line so that the cutting line can be easily removed from the spool;
   said top wall having a guide hole extending therethrough, said guide hole being configured to receive the cutting line;
   a plurality of legs each having a top end and a bottom end, said bottom end of each of said legs being attached to an upper surface of said top wall, each of said legs extending upwardly from said upper surface; and
   a platform having a top side and a bottom side, said bottom side being attached to said top ends of each of said legs, said top side having an opening therein extending through said top and bottom sides, said opening being configured to receive a weed trimmer or to allow access to a bottom side of a lawn mower positioned on said top side.

2. The assembly according to claim 1, wherein said rod is attached to said perimeter wall and traverses said aperture.

3. The assembly according to claim 1, wherein said top wall has a guide hole extending therethrough, said guide hole being configured to receive the cutting line.

4. The assembly according to claim 3, further including a flange being attached to and extending downwardly from a perimeter edge of said platform, said flange being coextensive with said perimeter edge, said flange having a conduit extending therethrough, said conduit being configured to receive the cutting line from said guide hole.

5. The assembly according to claim 1, further including a plurality of wheels being attached to said bottom wall.

6. The assembly according to claim 1, further including a plurality of hooks, each of said hooks being extendable into one of said legs, each of said legs having a plurality of wells therein for receiving one of said hooks.

7. The assembly according to claim 1, further including a lid being hingedly coupled to said platform, said lid being positionable in a closed position covering said opening or an open position exposing said opening.

8. The assembly according to claim 1, further including a support bar being pivotally coupled to one of said legs, said support bar being configured to extend between two of said legs to engage an article positioned between said platform and said base.

9. An equipment support rack assembly configured for holding equipment during the maintenance thereof, said assembly comprising:
   a base having a top wall, a bottom wall and a perimeter wall being attached to and extending between said top and bottom walls, said perimeter having an aperture extending therethrough to access an interior of said base;
   a rod being attached to said base, said rod being attached to said perimeter wall and traversing said aperture, said rod having a horizontal axis, said rod being configured to receive a spool of cutting line so that the cutting line can be easily removed from the spool;
   said top wall having a guide hole extending therethrough, said guide hole being configured to receive the cutting line;
   a plurality of wheels being attached to said bottom wall;
   a plurality of legs each having a top end and a bottom end, said bottom end of each of said legs being attached to an upper surface of said top wall, each of said legs extending upwardly from said upper surface;
   a plurality of hooks, each of said hooks being extendable into one of said legs, each of said legs having a plurality of wells therein for receiving one of said hooks, each of said legs having associated ones of said wells being vertically aligned with each other;
   a platform having a top side and a bottom side, said bottom side being attached to said top ends of each of said legs, said top side having an opening therein extending through said top and bottom sides, said opening being configured to receive a weed trimmer or to allow access to a bottom side of a lawn mower positioned on said top side;
   a flange being attached to and extending downwardly from a perimeter edge of said platform, said flange being coextensive with said perimeter edge, said flange having a conduit extending therethrough, said conduit being configured to receive the cutting line from said guide hole;
   a lid being hingedly coupled to said platform, said lid being positionable in a closed position covering said opening or an open position exposing said opening; and
   a support bar being pivotally coupled to one of said legs, said support bar being configured to extend between two of said legs to engage an article positioned between said platform and said base.

* * * * *